(12) United States Patent
Brubaker et al.

(10) Patent No.: US 9,061,671 B2
(45) Date of Patent: Jun. 23, 2015

(54) DRIVER BRAKING DEMAND INDICATOR APPARATUS FOR A HEAVY VEHICLE

(71) Applicant: Bendix Commercial Vehicle Systems LLC, Elyria, OH (US)

(72) Inventors: Christopher L. Brubaker, Lakewood, OH (US); Daniel J. Cellura, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 87 days.

(21) Appl. No.: 14/011,217

(22) Filed: Aug. 27, 2013

(65) Prior Publication Data
US 2015/0066321 A1    Mar. 5, 2015

(51) Int. Cl.
G06F 7/70    (2006.01)
B60T 17/22    (2006.01)
B60T 7/02    (2006.01)
B60W 50/14    (2012.01)
(Continued)

(52) U.S. Cl.
CPC . B60T 17/22 (2013.01); B60T 7/02 (2013.01); B60W 50/14 (2013.01); B60T 7/042 (2013.01); B60T 13/662 (2013.01); B60T 13/683 (2013.01)

(58) Field of Classification Search
CPC ... B60T 8/1708; B60T 8/3275; B60T 8/4081; B60T 13/72; B60T 13/74; B60T 2201/00; B60T 2220/00
USPC .......................................................... 701/70
See application file for complete search history.

(56) References Cited

U.S. PATENT DOCUMENTS 4,324,436 A * 4/1982 Reinecke ..................... 303/22.1
4,818,036 A * 4/1989 Reinecke ....................... 303/50
(Continued)

FOREIGN PATENT DOCUMENTS

DE    102011016125 A1    11/2012
EP    0937623 A2    2/1999
(Continued)

OTHER PUBLICATIONS

Li He, Xiaolong Wang, Yunqing Zhang, Jinglai Wu, Liping Chen"Modeling and Simulation Vehicle Air Brake System" Proceedings8th Modelica Conference, Dresden, Germany, Mar. 20-22, 2011.*

(Continued)

Primary Examiner — Calvin Cheung
(74) Attorney, Agent, or Firm — Cheryl L. Greenly; Eugene E. Clair; Brian E. Kondas

(57) ABSTRACT

A driver braking demand indicator apparatus comprises a brake valve including (i) a brake valve member movable in response to a driver moving a brake applicator member, and (ii) a delivery pressure line to operate a vehicle service brake circuit. The apparatus also comprises a travel sensor arranged to (i) sense movement of the brake valve member, and (ii) provide a first signal indicative of the extent of travel of the brake valve member when movement of the brake valve member is sensed. The apparatus further comprises a delivery pressure line sensor arranged to (i) sense pressure in the delivery pressure line of the brake valve, and (ii) provide a second signal indicative of the pressure in the delivery pressure line. The apparatus also comprises a controller arranged to process the first and second signals to provide a driver braking demand signal for at least one external device.

13 Claims, 3 Drawing Sheets

(51) Int. Cl.
    *B60T 7/04*     (2006.01)
    *B60T 13/66*    (2006.01)
    *B60T 13/68*    (2006.01)

(56) References Cited

U.S. PATENT DOCUMENTS

| | | | |
|---|---|---|---|
| 5,129,712 A * | 7/1992 | Feldmann et al. | 303/15 |
| 5,365,791 A | 11/1994 | Padula et al. | |
| 5,395,164 A * | 3/1995 | Sulzyc | 303/15 |
| 5,439,275 A * | 8/1995 | Padula et al. | 303/3 |
| 5,496,097 A * | 3/1996 | Eckert | 303/155 |
| 5,669,678 A * | 9/1997 | Stumpe et al. | 303/155 |
| 5,941,608 A * | 8/1999 | Campau et al. | 303/113.4 |
| 6,149,248 A * | 11/2000 | Lubbers et al. | 303/114.1 |
| 6,230,492 B1 * | 5/2001 | Kingston et al. | 60/545 |
| 6,234,290 B1 | 5/2001 | Drexl et al. | |
| 6,866,346 B2 | 3/2005 | Leske et al. | |
| RE44,677 E * | 12/2013 | Campau et al. | 303/113.4 |
| 8,783,791 B2 * | 7/2014 | Eberling et al. | 303/3 |
| 2002/0105423 A1 * | 8/2002 | Rast | 340/479 |
| 2004/0127333 A1 * | 7/2004 | McCall | 477/206 |
| 2004/0135432 A1 * | 7/2004 | Reuter et al. | 303/152 |
| 2007/0170774 A1 | 7/2007 | Gerum et al. | |
| 2009/0189441 A1 | 7/2009 | Degoul et al. | |
| 2010/0181152 A1 * | 7/2010 | Anderson et al. | 188/152 |
| 2011/0130935 A1 * | 6/2011 | Krueger et al. | 701/70 |
| 2013/0124060 A1 * | 5/2013 | Svensson et al. | 701/70 |
| 2013/0205881 A1 * | 8/2013 | Naether et al. | 73/121 |
| 2013/0257140 A1 * | 10/2013 | Ogiwara et al. | 303/3 |
| 2013/0293000 A1 * | 11/2013 | Kubick et al. | 303/167 |
| 2013/0320751 A1 * | 12/2013 | Eberling et al. | 303/14 |
| 2014/0129108 A1 | 5/2014 | Greiser-Schmitz | |
| 2014/0131154 A1 * | 5/2014 | Ganzel | 188/355 |
| 2014/0174072 A1 | 6/2014 | Ishisuka | |
| 2014/0265547 A1 * | 9/2014 | Ganzel | 303/66 |

FOREIGN PATENT DOCUMENTS

| | | |
|---|---|---|
| EP | 1343674 B1 | 8/2008 |
| WO | WO9839184 A1 | 9/1998 |
| WO | WO0024618 A1 | 5/2000 |
| WO | WO2013042620 A1 | 3/2013 |

OTHER PUBLICATIONS

DX65D Foot Brake Valve, customer documentation, Oct. 5, 2005, 1 page, Knorr-Bremse AG, Munich Germany.

European Patent Office, PCT Notification of Transmittal of International Search Report and Written Opinion of International Searching Authority, Jan. 29, 2015, 10 pages, European Patent Office, Munich Germany.

* cited by examiner

DRIVER BRAKING DEMAND INDICATOR APPARATUS FOR A HEAVY VEHICLE

BACKGROUND

The present application relates to heavy vehicle braking, and is particularly directed to a driver braking demand indicator apparatus for a heavy vehicle, such as a truck.

A known method of indicating driver braking demand is determining the extent of travel of a plunger of a foot brake valve of the truck. When the driver desires to operate the vehicle service brakes, the driver applies a foot to a brake pedal which, in turn, causes travel movement of the plunger. A drawback in using the plunger travel method is that sensitivity of the foot brake valve (i.e., delivery pressure/travel distance) increases significantly at higher levels of driver braking demand. This high sensitivity makes it difficult to determine the driver's intended braking demand using only travel movement of the plunger. Another drawback in using the plunger travel method is that additional mechanical components are required. These mechanical components would otherwise not be needed in a typical foot brake valve.

Another known method of indicating driver braking demand is determining valve delivery pressure in a braking circuit of the foot brake valve of the truck. A drawback in using the valve delivery pressure method is the absence or lack of information about the driver's intent to slow the truck during initial stages of pedal movement. This occurs because there needs to be at least some movement of the brake pedal and at least some travel movement of the plunger before valve pressure is actually delivered. It would be desirable to provide an apparatus and method of indicating driver braking demand which overcomes drawbacks of known methods of indicating driver braking demand.

SUMMARY

In accordance with one embodiment, a driver braking demand indicator apparatus is provided for a heavy vehicle having a movable brake applicator member and at least one external device which can process a driver braking demand signal. The driver braking demand indicator apparatus comprises a brake valve including (i) a brake valve member movable in response to a vehicle driver moving the brake applicator member, and (ii) a delivery pressure line to operate a vehicle service brake circuit. The apparatus also comprises a travel sensor arranged to (i) sense movement of the brake valve member of the brake valve, and (ii) provide a first signal indicative of the extent of travel of the brake valve member when movement of the brake valve member is sensed. The apparatus further comprises a delivery pressure line sensor arranged to (i) sense pressure in the delivery pressure line of the brake valve, and (ii) provide a second signal indicative of the pressure in the delivery pressure line. The apparatus also comprises a controller arranged to process the first and second signals to provide a driver braking demand signal for the at least one external device.

In accordance with another embodiment, a driver braking demand indicator apparatus is provided for a heavy vehicle. The driver braking demand indicator apparatus comprises means for providing (i) a first signal indicative of extent of travel of a brake valve member of a brake valve, and (ii) a second signal indicative of pressure in a delivery pressure line associated with the brake valve. The apparatus further comprises means for providing a driver braking demand signal in response to the first and second signals.

In accordance with yet another embodiment, a program storage medium readable by a computer has a memory. The medium tangibly embodies one or more programs of instructions executable by the computer to perform method steps for processing signals of a brake valve apparatus of a heavy vehicle. The method comprises the steps of receiving a first signal indicative of extent of travel of a brake valve member of a brake valve, receiving a second signal indicative of pressure in a delivery pressure line associated with the brake valve, producing a driver braking demand signal which varies as a function of only the first signal when the first signal is at or below a first predetermined threshold value, and producing a driver braking demand signal which varies as a function of only the second signal when the first signal is at or above a second predetermined threshold value.

DETAILED DESCRIPTION

Figure 1:
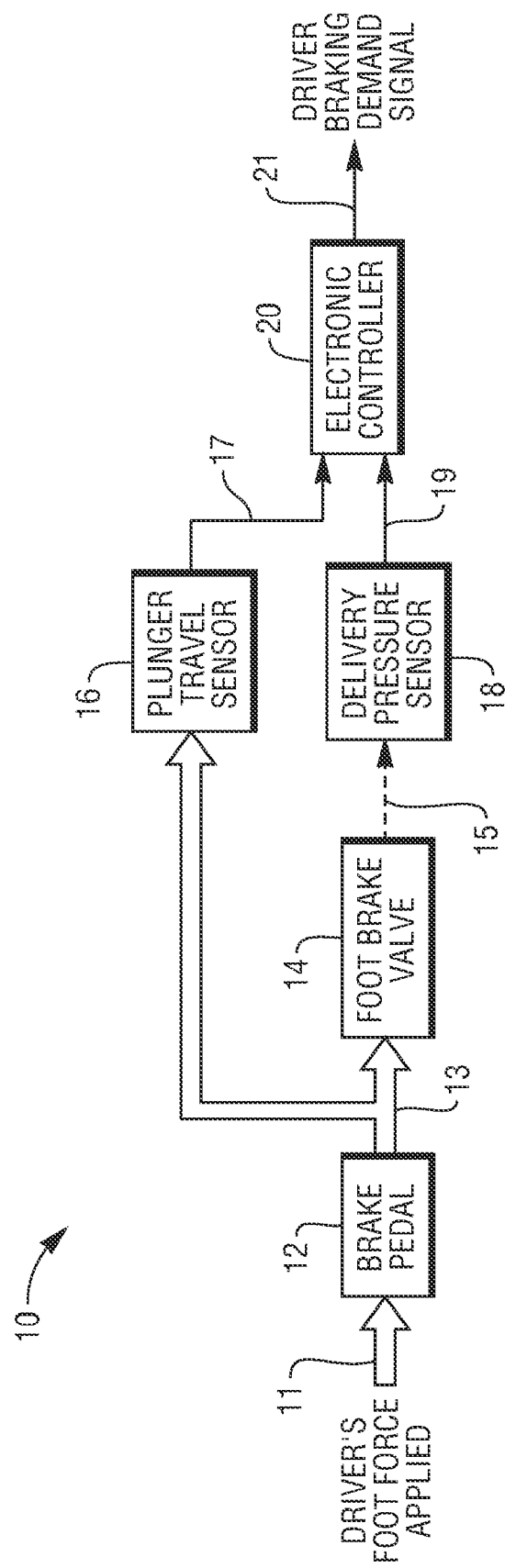
FIG. 1 is a schematic block diagram showing a driver braking demand indicator apparatus constructed in accordance with one embodiment.

Referring to FIG. 1, apparatus 10 is provided for use in a heavy vehicle such as a truck. Apparatus 10 is constructed in accordance with one embodiment. In FIG. 1, electrical line connections are shown as solid lines, pneumatic line connections are shown as dashed lines, and mechanical couplings or physical contacts are shown as clear thick lines.

Brake pedal 12 is operatively coupled to foot brake valve 14 in known manner. Pedal 12 may comprise any type of commercially available brake pedal. The pneumatic portion of valve 14 may comprise any type of commercially available foot brake valve. Pedal 12 may be part of valve 14, or may be separate from valve 14 and connected through linkages to valve 14.

When the vehicle driver desires to apply service brakes of the vehicle, the vehicle driver applies a foot (as represented by line 11) to pedal 12 to move via line 13 a plunger (not shown) within valve 14. Travel movement of the plunger closes an exhaust port and opens passages within valve 14 to allow air pressure waiting there to pass through and be delivered to front and rear braking systems to apply service brakes of the vehicle to slow and stop the vehicle.

When the vehicle driver's foot is removed from pedal 12, internal return springs within valve 14 move back to their original positions. This allows air in valve 14 and delivery lines to vent to atmosphere through the exhaust port. Structure and operation of brake pedals and foot brake valves to slow and stop a vehicle are known and, therefore, will not be described.

Plunger travel sensor 16 is operatively connected to valve 14 and pedal 12 to provide a signal on line 17 indicative of the extent of travel of the plunger within valve 14 when the foot of the vehicle driver is applied to pedal 12. Sensor 16 may comprise any type of travel sensor, such as a Hall effect device or linear variable differential transformer (LVDT) sensors. Delivery pressure sensor 18 is operatively coupled via line 15 to valve 14 to provide a signal on line 19 indicative of pressure in a pressure line of valve 14. Sensor 18 may comprise any type of commercially available pressure sensor.

Electronic controller 20 monitors signal on line 17 from plunger travel sensor 16, and may store the signal data in memory. Controller 20 also monitors signal on line 19 from delivery pressure sensor 18, and may store the signal data in memory. Any combination of controller 20, delivery pressure sensor 18, plunger travel sensor 16, foot brake valve 14, and brake pedal 12 may comprise one or more single integrated units. As an example, all components may comprise a single integrated unit. As another example, controller 20 may comprise a single integrated unit while remaining components comprise a separate single integrated unit. Specific components used in foot brake valve apparatus 10 shown in FIG. 2 will depend upon the particular type of vehicle in which apparatus 10 is installed.

Components of apparatus 10 co-operate to provide driver braking demand signal on line 21. Signal on line 21 is indicative of the amount of braking intended by the vehicle driver when the driver's foot is applied to pedal 12. Signal on line 21 may be applied to any type of external device. For example, signal on line 21 may be applied to another electronic controller via a serial communications link, such as SAE J1939. As other examples, signal on line 21 may be applied as a pulse width modulation (PWM) signal or directly as an analog signal for processing by dependent systems such as braking system controller, brake lamp controller, transmission controller, or others. The driver braking demand indicator on line 21 is provided in accordance with a method to be described hereinbelow.

Figure 2:
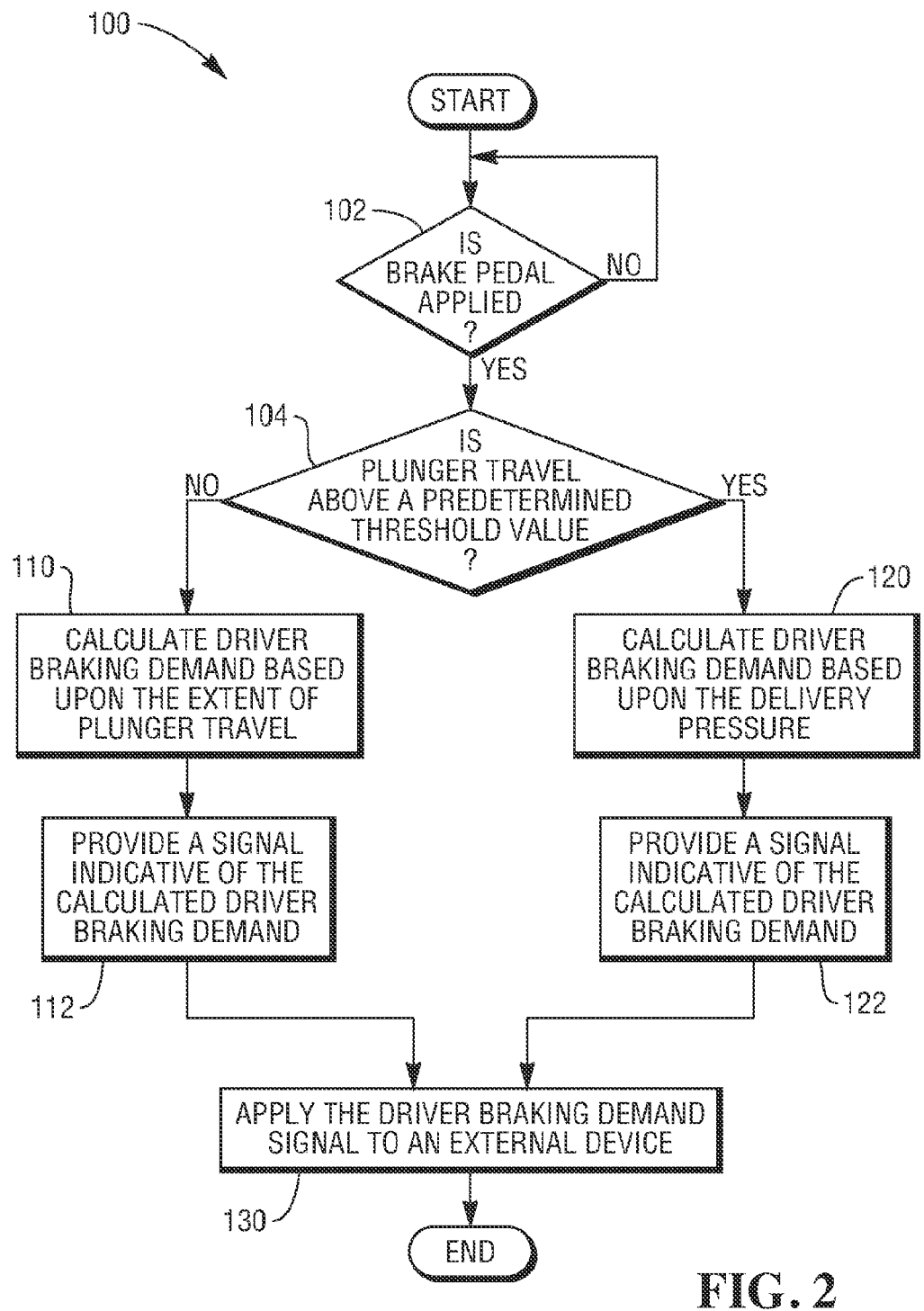
FIG. 2 is a flow diagram depicting a method of operation of the driver braking demand indicator apparatus of FIG. 1 in accordance with one embodiment.

Referring to FIG. 2, flow diagram 100 depicts operation of apparatus 10 of FIG. 1 in accordance with one embodiment. Program instructions for enabling controller 20 shown in FIG. 1 to perform operation steps in accordance with flow diagram 100 shown in FIG. 2 may be embedded in memory internal to controller 20. Alternatively, or in addition to, program instructions may be stored in memory external to controller 20. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

Figure 3:
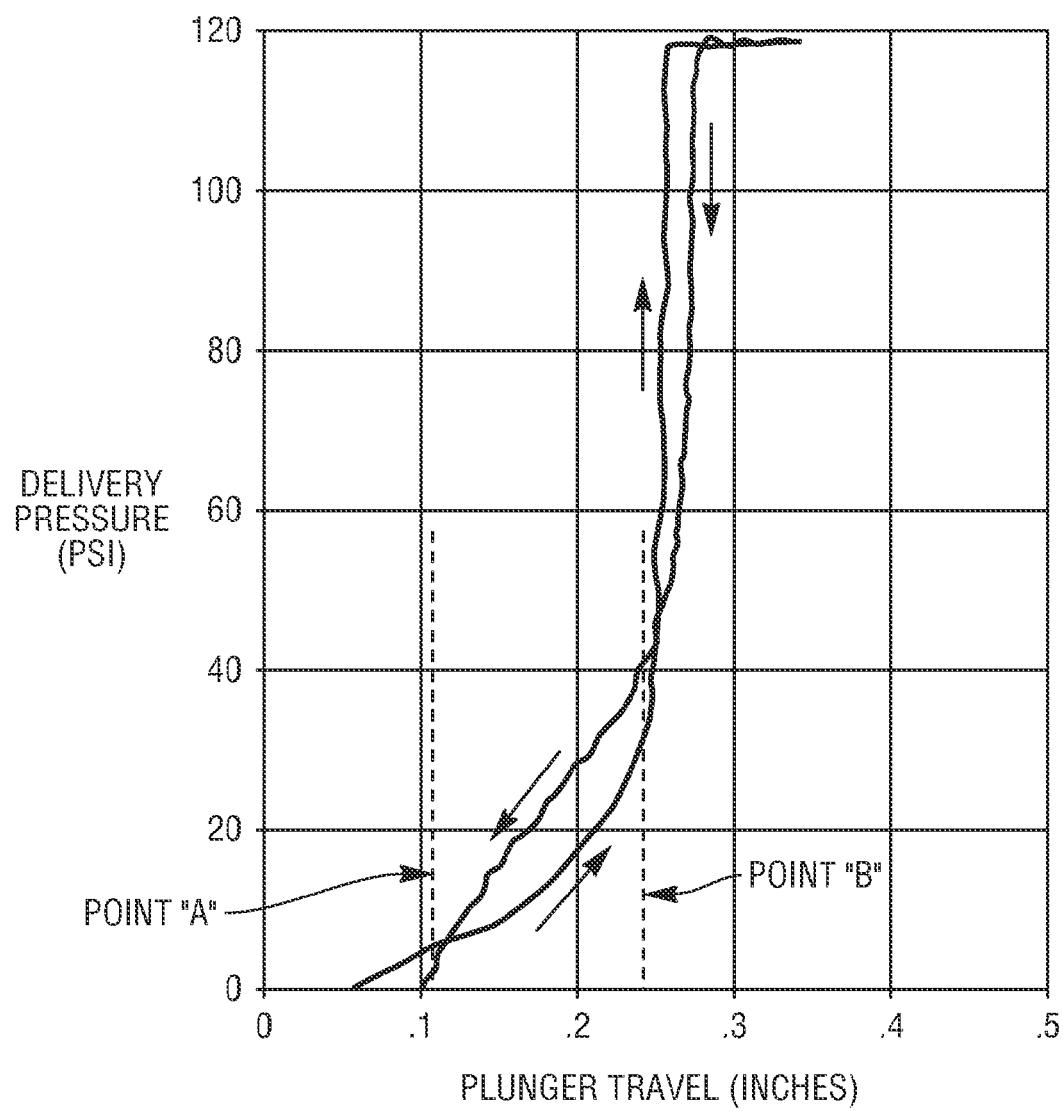
FIG. 3 shows a graph of a known foot braking valve which is operated in accordance with the method of FIG. 2.

Reference to FIG. 3 will be made as steps contained in flow diagram 100 of FIG. 2 are being described hereinbelow. In step 102, a determination is made as to whether the vehicle driver is moving the pedal 12. If determination in step 102 is negative (i.e., the vehicle driver is not moving the pedal 12), the process returns to step 102 and continues to monitor pedal 12 for application of a foot thereto. However, if determination in step 102 is affirmative (i.e., the vehicle driver is moving the pedal 12), the process proceeds to step 104.

A determination is made in step 104 as to whether plunger within valve 14 has traveled above a predetermined threshold distance value in response to the vehicle driver moving the pedal 12. An example predetermined threshold value is shown as point "A" in FIG. 3. If determination in step 104 is negative (i.e., plunger within valve 14 has traveled only below or up to the predetermined threshold value), the process proceeds to step 110. In step 110, an amount of driver braking demand is calculated. The amount of driver braking demand is calculated based upon the extent of travel of the plunger within valve 14. Then, in step 112, an electrical signal is provided on line 21 (FIG. 1) which is indicative of the calculated driver braking demand from step 110. Signal on line 21 can then be applied to an external device as shown in step 130.

However, if determination back in step 104 is affirmative (i.e., plunger within valve 14 has traveled above the predetermined threshold value), the process proceeds to step 120. In step 120, an amount of driver braking demand is calculated. The amount of driver braking demand is calculated based upon the pressure in a delivery pressure line of valve 14. Then, in step 122, an electrical signal is provided on line 21 which is indicative of the calculated driver braking demand from step 120. Signal on line 21 can then be applied to an external device as shown in step 130.

It should be apparent that driver braking demand signal on line 21 is produced in response to the plunger travel sensor signal on line 17 when the plunger travel sensor signal is at or below the predetermined threshold value, and that driver braking demand signal on line 21 is produced in response to the delivery pressure sensor signal on line 19 when the plunger travel sensor signal on line 17 is above the predetermined threshold value.

It should also be apparent from the graph shown in FIG. 3 that the driver braking demand signal on line 21 shown in FIG. 1 is based upon the extent of travel of the plunger within valve 14 when the amount of driver braking demand is relatively small (i.e., small enough such that the extent of plunger travel is at or below the predetermined threshold value). However, when the amount of driver braking demand is relatively large (i.e., large enough such that the plunger travel is above the predetermined threshold value), then the driver braking demand signal on line 21 shown in FIG. 1 is based upon the pressure in a delivery pressure line of valve 14. Thus, the driver braking demand indicator on line 21 varies as a function of plunger travel for relatively small driver braking demands, and varies as a function of delivery line pressure for relatively large driver braking demands.

It should further be apparent that the predetermined threshold value for plunger travel is selectable. As an example, the predetermined threshold value may be selectable in a range of plunger travel between points "A" and "B" shown in FIG. 3. Point "B" may represent the highest predetermined threshold value for plunger travel. This is because the plunger travel curve at this point becomes too sensitive for calculating and inferring accurate driver braking demand based upon the extent of plunger travel. Accordingly, the predetermined threshold value may be selectable between a highest value and a lowest value (such as points "A" and "B" shown in FIG. 3, for examples) to optimize sensitivity and accuracy of the driver braking demand signal on line 21.

In another embodiment, it is conceivable that more than one predetermined threshold distance value may be used. For example, a first predetermined threshold value may be defined at point "A" and a second predetermined threshold value may be defined at point "B" shown in FIG. 3. In this embodiment, the driver braking demand indicator signal on line 21 (FIG. 1) varies as a function of (i) only signal on line 17 from travel sensor 16 when signal on line 17 is at or below the first predetermined threshold value, (ii) only signal on line 19 from pressure sensor 18 when signal on line 17 is above the second predetermined threshold value, and (iii) either only signal on line 17 or only signal on line 19 when signal on line 17 is between the first and second predetermined threshold values. Controller 20 may be programmed to choose either only the signal on line 17 from travel sensor 16 or only signal on line 19 from pressure sensor 18 when signal on line 17 is between the first and second predetermined threshold values.

A number of advantages result by providing a driver braking demand indicator on line 21 in accordance with the above-described description. One advantage is that the driver braking demand signal on line 21 is more robust (i.e., remains a true indicator of driver braking demand) as parts of valve 14 wear and become older. For example, valve 14 may have a rubber graduation spring. The compression of this spring has a tendency to set and thereby to degrade over time. This degradation would cause the driver braking demand indicator on line 21 in a pedal travel sensor only system to drift and not be a true indicator of driver braking demand. By providing a driver braking demand indicator on line 21 in accordance with the above-described description, a true driver braking demand indicator is maintained over time even as parts, such as rubber graduation springs, degrade.

Although the above-description describes use of one electronic controller associated with foot brake valve 14 (whether dedicated or not dedicated to foot brake valve 14), it is conceivable that any number of electronic controllers may be used. Moreover, it is conceivable that any type of electronic controller may be used. Suitable electronic controllers for use in vehicles are known and, therefore, have not been described.

Also, although the above-description describes controller 20 as continuously monitoring two sensor signals (i.e., first and second sensor signals), it is conceivable that these sensor signals be periodically sampled instead of continuously monitored.

Although the above-description describes a brake applicator member in the form of a foot-operable brake pedal 12 shown in FIG. 1, it is conceivable that the brake applicator member may be in a different form, such as a hand-operable brake mechanism for example. Accordingly, although the above-description describes a brake valve in the form of a foot brake valve 14 shown in FIG. 1, it is conceivable that the brake valve may be in a different form, such as a hand brake valve for example.

Also, although the above-description describes a brake valve member in the form of a movable plunger within valve 14 shown in FIG. 1, it is conceivable that the brake valve member whose movement is sensed may be a movable piston within valve 14 for example.

Further, although the above-description describes apparatus 10 being used in a heavy vehicle such as a truck, it is conceivable that apparatus 10 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A driver braking demand indicator apparatus for a heavy vehicle having a movable brake applicator member and at least one external device which can process a driver braking demand signal, the driver braking demand indicator apparatus comprising:
    a brake valve including
        (i) a brake valve member movable in response to a vehicle driver moving the brake applicator member, and
        (ii) a delivery pressure line to operate a vehicle service brake circuit;
    a travel sensor arranged to
        (i) sense movement of the brake valve member of the brake valve, and
        (ii) provide a first signal indicative of the extent of travel of the brake valve member when movement of the brake valve member is sensed;
    a delivery pressure line sensor arranged to
        (i) sense pressure in the delivery pressure line of the brake valve, and
        (ii) provide a second signal indicative of the pressure in the delivery pressure line; and
    a controller arranged to process the first and second signals to provide a driver braking demand signal for the at least one external device, wherein
    the controller is arranged to calculate the driver braking demand signal based upon the first signal when the extent of brake valve member travel is determined to be at or below a first predetermined threshold value and
    the controller is arranged to calculate the driver braking demand signal based upon the second signal when the extent of brake valve member travel is determined to be above the first predetermined threshold value.

2. The driver braking demand indicator apparatus according to claim 1, wherein the controller is arranged to
    (i) calculate the driver braking demand signal based upon the first signal when the extent or brake valve member travel is determined to be at or below the first predetermined threshold value, and
    (ii) calculate the driver braking demand signal based upon the second signal when the extent or brake valve member travel is determined to be at or above a second predetermined threshold value.

3. The driver braking demand indicator apparatus according to claim 2, wherein the controller is arranged to calculate the driver braking demand signal based upon either only the first signal or only the second signal when the extent of brake valve member travel is determined to be between the first predetermined threshold value and the second predetermined threshold value.

4. The driver braking demand indicator apparatus according to claim 1, wherein
    (i) the movable brake applicator member includes a brake pedal, and
    (ii) the brake valve includes a foot brake valve which is operable in response to application of a vehicle driver's foot to the brake pedal.

5. The driver braking demand indicator apparatus according to claim 1, wherein the controller is dedicated to operation of the brake valve.

6. A driver braking demand indicator apparatus for a heavy vehicle, the driver braking demand indicator apparatus comprising:
    means for providing
        (i) a first signal indicative of extent of travel of a brake valve member of a brake valve, and
        (ii) a second signal indicative of pressure in a delivery pressure line associated with the brake valve; and
    means for providing a driver braking demand signal in response to the first and second signals wherein
    the means for providing a driver braking demand signal includes means for calculating the driver braking demand signal based upon only the first signal when brake valve member travel is determined to be at or below a first predetermined threshold value and
    the means for providing a driver braking demand signal includes means for calculating the driver braking demand signal based upon only the second signal when brake valve member travel is determined to be above the first predetermined threshold value.

7. The driver braking demand indicator apparatus according to claim 6, wherein the means for providing a driver braking demand signal includes
means for
(i) calculating the driver braking demand signal based upon only the first signal when the extent of brake valve member travel is determined to be at or below the first predetermined threshold value, and
(ii) calculating the driver braking demand signal based upon only the second signal when the extent or brake valve member travel is determined to be at or above a second predetermined threshold value.

8. The driver braking demand indicator apparatus according to claim 7, wherein the controller is arranged to calculate the driver braking demand signal based upon either only the first signal or only the second signal when the extent of brake valve member travel is determined to be between the first predetermined threshold value and the second predetermined threshold value.

9. The driver braking demand indicator apparatus according to claim 6, wherein
(i) the movable brake applicator member includes a brake pedal, and
(ii) the brake valve includes a foot brake valve which is operable in response to application of a vehicle driver's foot to the brake pedal.

10. A non-transitory storage medium readable by a computer having a memory, the non-transitory storage medium tangibly embodying one or more programs of instructions executable by the computer to perform method steps for processing signals of a brake valve apparatus of a heavy vehicle, the method comprising the steps of:
receiving a first signal indicative of extent of travel of a brake valve member of a brake valve;
receiving a second signal indicative of pressure in a delivery pressure line associated with the brake valve;
producing a driver braking demand signal which varies as a function of only the first signal when the first signal is at or below a first predetermined threshold value; and
producing a driver braking demand signal which varies as a function of only the second signal when the first signal is at or above a second predetermined threshold value.

11. The non-transitory storage medium according to claim 10, wherein the first predetermined threshold value is less than the second predetermined threshold value.

12. The non-transitory storage medium according to claim 11, wherein the method further comprises:
producing a driver braking demand signal which varies as a function of either only the first signal or only the second signal when the first signal is between the first predetermined threshold value and the second predetermined threshold value.

13. The non-transitory storage medium according to claim 11, wherein the first predetermined threshold value and the second predetermined threshold value are the same value.

* * * * *